B. F. GLADDING.
Horse Hay-Fork.
No. 86,661.  Patented Feb 9, 1869.
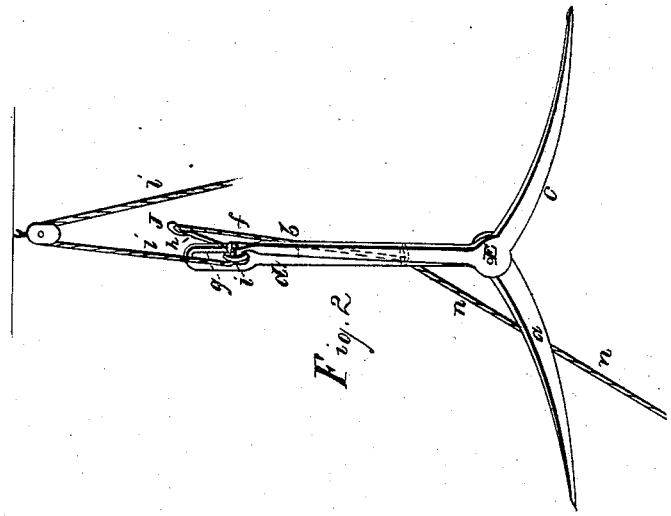
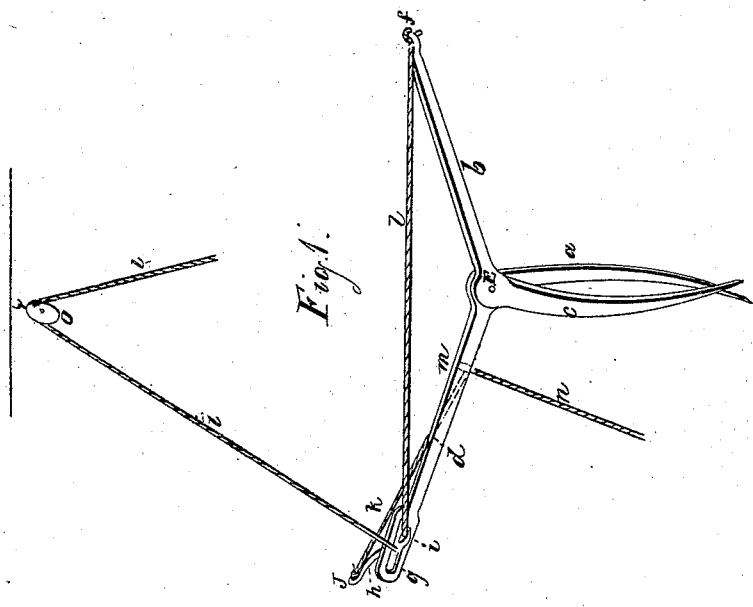

BENJAMIN F. GLADDING, OF PROVIDENCE, RHODE ISLAND.

Letters Patent No. 86,661, dated February 9, 1869.

IMPROVEMENT IN HORSE HAY-FORKS.

The Schedule referred to in these Letters Patent and making part of the same.

*To all whom it may concern:*

Be it known that I, BENJAMIN F. GLADDING, of the city and county of Providence, in the State of Rhode Island, have invented a new and useful Machine for Loading and Unloading Hay; and I do hereby declare that the following is a full, clear, and exact description of the construction and operation of the same, reference being had to the annexed drawings, making a part of this specification.

I make, of iron, in one piece, a curved finger, $a$, and a handle to the same, marked $d$, for one part, and a corresponding finger, $c$, and handle $b$, for the other part, shaped as shown in the drawings accompanying this specification.

I fasten the parts together, at E, with a pivot, on which they turn.

I make a ring, $f$, at the end of handle $b$, and a slot, $g$, in the end of handle $d$.

I place a lever, $h$, in the slot $g$, working on a pivot, $k$.

I make a ring, $j$, at one end of the lever, and a hook, $i$, at the other.

I then fasten a rope, $l\ l\ l$, to the ring $f$, and carry the same across and pass it under the hook $i$, and then carry the same over a pulley, $o$.

I place the fork as seen at Figure 1, and push the points of the fingers into the hay. Then I apply power to the end of rope $l\ l\ l$, and, by that means, draw the handles $d$ and $b$ together, and bury the fingers $a$ and $c$ in the hay, and spread them apart, as seen in Figure 2, and retain them in that position while the fork and hay are raised to any desired position.

I fasten a rope, $n$, to ring $j$, and pass it down through a ring, $m$, on handle $d$.

When the fork and hay have reached the desired position, I pull the rope $n$, and, by that means, release the rope $l\ l\ l$ from the hook $i$, and the fork resumes its first position, as seen at fig. 1, and the hay is deposited in the place desired.

What I claim as my invention, and desire to secure by Letters Patent, is—

A power hay-fork, constructed and operated as above set forth and described, and in the manner and for the purposes herein specified.

B. F. GLADDING.

Witnesses:
 S. S. LAPHAM,
 H. B. POTTER.